Figure 1:
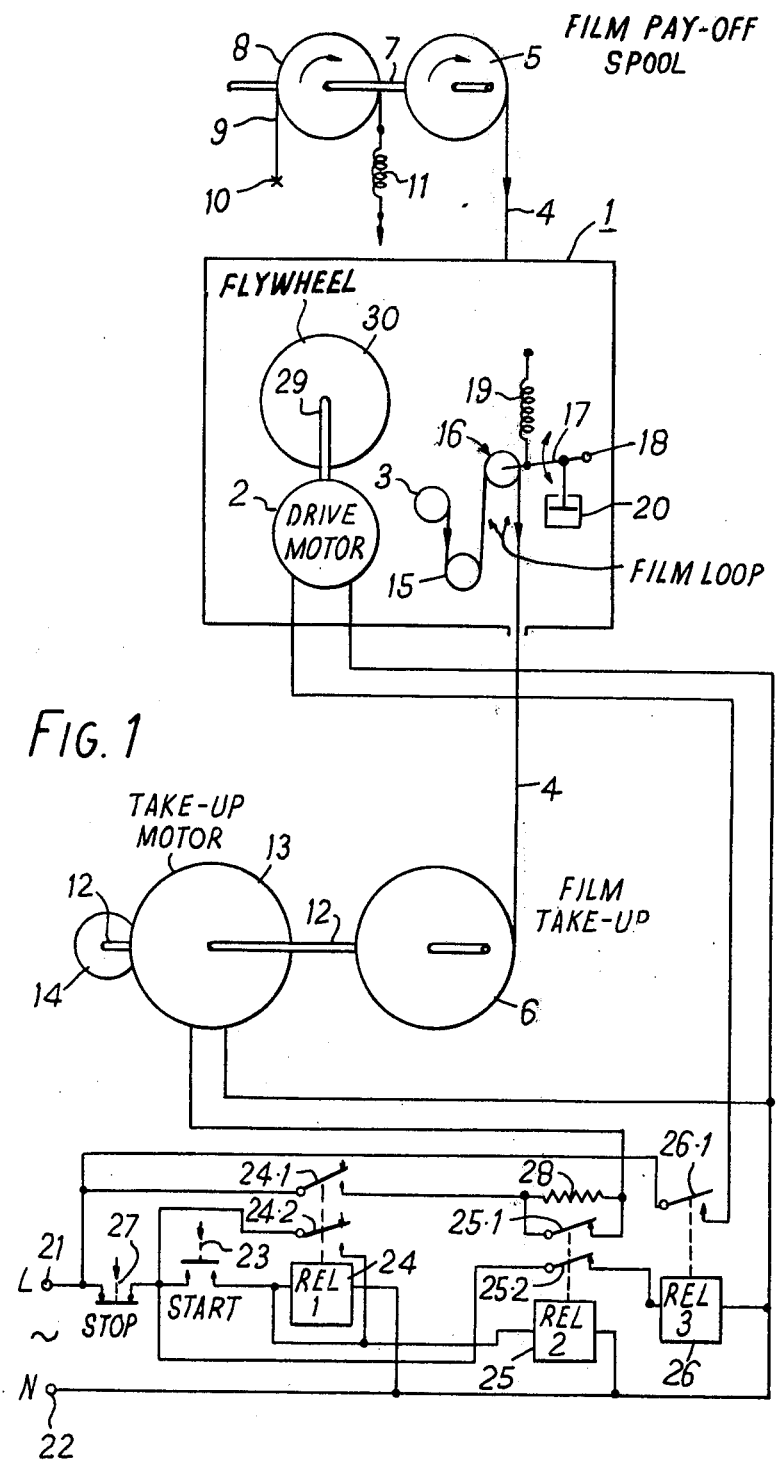

United States Patent [19]
Osborn et al.

[11] 3,942,883
[45] Mar. 9, 1976

[54] CINEMATOGRAPH FILM TRANSPORT MECHANISMS

[75] Inventors: Leroy Gordon Osborn, London; George Hunnam Brownlee, Harrow, both of England

[73] Assignee: Westrex Company Limited, London, England

[22] Filed: June 21, 1974

[21] Appl. No.: 481,720

[30] Foreign Application Priority Data
June 25, 1973 United Kingdom............... 30014/73

[52] U.S. Cl. .................... 352/166; 352/14; 352/22; 352/174
[51] Int. Cl.² .......................................... G03B 1/00
[58] Field of Search ............ 352/166, 174, 178, 22, 352/14; 242/203, 205, 208

[56] References Cited
UNITED STATES PATENTS
2,771,814   11/1956  Isom .................... 352/174
3,025,751   3/1962   Braun ................... 352/14

*Primary Examiner*—Monroe H. Hayes
*Attorney, Agent, or Firm*—Alan C. Rose; Thomas A. Turner, Jr.

[57] ABSTRACT

Film tensioning and controlling transport mechanism for a cinematograph film projector. The film take-up mechanism has a torque motor drive separate from the projector mechanism drive motor. The torque motor is energised first to tension film before the projector drive motor is energised. The torque motor is first energised with a series temperature-sensitive resistor so that torque, and film-tension, increases before the projector mechanism starts up. Film between the projector mechanism and the take-up spool is formed into a loop over a movable roller, which is spring-tensioned in the loop-lenghtening direction but is restrained by a dashpot in the loop-shortening direction. Film-tension reduces the loop length, but the projector drive motor is energised before the whole loop is taken up.

5 Claims, 1 Drawing Figure

CINEMATOGRAPH FILM TRANSPORT MECHANISMS

This invention relates to cinematograph film transport mechanisms and particularly to pay-off spool and take-up spool drive and control means for such transport mechanisms. The term "spool" herein refers equally to a so-called reel having retaining checks on both sides of the film coil, a so-called plate having a single check and a so-called film wind centre having no checks.

In a cinematograph projector, film is drawn off a pay-off spool, driven through the projection gate of the projector and taken up on a take-up spool. The pay-off spool rotates more rapidly as the film is drawn off, due to the progressively reducing diameter of the coil of film on the spool. The take-up spool correspondingly rotates more slowly as the coil of projected film progressively increases in diameter. Further, there is the requirement to maintain in slight tension both the length of film extending between the pay-off spool and the film feed sprocket of the projector mechanism and the length of film extending between the film take-up sprocket of the projector mechanism and the take-up spool.

For the projection of film above a certain footage in length, over 1,000 ft. and up to 6,000 ft., for example, it is not practicable to use a friction clutch drive to the take-up spool shaft. It has become general practice to use an electric torque motor for this take-up spool drive.

The projector drive mechanism has its own drive motor and when a separate motor is used for the take-up drive, as stated, the problem arises to avoid the formation of a film loop between the projector mechanism and the take-up spool.

This problem is particularly acute upon starting, or restarting, a projector. This is due to the relatively low inertia, and quick acceleration, of the projector drive elements, when driven by the usual induction or synchronous electric motor drive, and the relatively slow acceleration of the large-diameter and heavy take-up spool, further weighted by projected film wound thereon, when driven by its own torque motor drive.

The object of the present invention is to provide an improved cinematograph film transport mechanism having regard to these and other requirements.

Accordingly, the invention provides cinematogrph film transport mechanism for a cinematograph projector incluidng a projector mechanism for transporting film through the projection gate and a film take-up mechanism for spooling the projected film thereafter, the said projector mechanism and the said take-up mechanism being independently driven by projector and take-up electric motors, in which the two motors are sequentially energised by sequentially operating switch means, the take-up motor supply circuit including a power-limiting element and the sequentially operating switch means comprising a first switch for energising the take-up motor before the projector motor and by way of the power-limiting element and second switch means for subsequently energising the projector motor and for excluding from circuit the take-up motor power-limiting element.

The film transport mechanism preferably includes means for forming a shock-absorbing film loop between the projector mechanism and the film take-up mechanism.

In a preferred embodiment of the invention, the film take-up motor is a torque motor having a temperature-sensitive resistor series connected in its supply circuit. This torque motor is the first motor to be energised. The projected film is thereby tensioned and this tension increases with reduction of resistance of the temperature-sensitive resistor as its temperature rises.

Conveniently, the shock-absorbing loop is formed by leading the film over a movable roller carried by a pivoted arm. The arm is spring-tensioned to take up film by lengthening the loop and is restrained solely for movement in the loop-shortening sense by a differential dashpot.

Also, in the preferred embodiment of the invention, the sequentially-operating switch means comprises a manually operated START switch which actuates two relays in sequence, the first relay energising the torque take-up motor through the series resistor and the second relay energising the projector motor and short-circuiting the resistor in the take-up motor circuit.

In order that the invention may be readily carried into practice, one embodiment thereof will now be described in detail, by way of example, with reference to the accompanying drawing, the sole FIGURE of which is a diagrammatic representation of a cinematograph film transport mechanism in accordance with the invention, comprising a film projector mechanism and a film take-up mechanism with separate drive motors, together with a schematic circuit diagram showing the supply circuits and switch means for energising the two motors.

In the FIGURE, a cinematograph film projector is indicated generally at 1 and has a drive motor 2 which drives the shutter, intermittent motion and film feed sprockets of the projector mechanism.

A driven film sprocket 3 may be the projector take-up sprocket or may be a separate driven sprocket following the take-up sprocket.

Cinematograph film 4 is drawn off a pay-off spool 5 and passes to the projector mechanism, after which it is taken up on a take-up spool 6. The pay-off spool 5 is carried by and drives a shaft 7 which also carries a friction pulley 8. A friction belt 9 passes around the pulley 8 and is attached to a fixed point 10 at one end and to a tension spring 11 at the other end, to provide friction holdback of the pay-off spool 5.

The take-up spool 6 is carried by and driven from a shaft 12 which is driven by a torque motor 13. The shaft 12 also carries a rotating disc 14 of a light friction clutch, to stop film spooling off the spool 6 when the film 4 is not tensioned.

Shown diagrammatically within the block representing the projector 1 is the film sprocket 3 followed by a fixed roller 15 and a shock loop absorption roller 16. The film 4 passes over the sprocket 3 and over the rollers 15 and 16 in succession before passing to the take-up spool 6.

The roller 16 is carried at one end of an arm 17 which is pivoted at its other end 18. A bias spring 19 acts upwardly upon the arm 17, as shown in the drawing, to tension the film loop formed over the roller 16. Movement of the arm 17, depending upon the loop length, is controlled by a differential dashpot 20. The dashpot 20 permits of free upward movement of the arm 17, to increase the film loop length, but offers resistance to the downward movement of the arm 17, to shorten the film loop length.

As shown in the circuit diagram at the lower part of the figure, both motors 2 and 13 are supplied from an alternating current supply at terminals 21 and 22. The circuit supplying the torque motor is closed by START contactor 23 which energises relay 24 to close supply contact 24.1 and to close "Hold" contact 24.2. With contact 24.1 closed, the motor 13 is supplied by way of a series-connected Brimistor (Registered Trade Mark) temperature-sensitive resistor 28. Initially, the series resistor 28 serves to reduce the torque of drive motor 13. As the motor runs, the resistor temperature increases due to the current flowing therein, the resistance falls and the motor torque increases.

The START contactor 23 also closes the circuit through delay relay 25 which operates after a short delay of a few seconds following relay 25 to close contacts 25.1 and 25.2. Closure of contact 25.1 short-circuits the resistor 28, thereby increasing the torque motor 13 drive to full power. Closure of contact 25.2 energises relay 26 to close contact 26.1 and supply the projector drive motor 2.

The projector drive motor starts up with full drive power and is shown driving a shaft 29 which carries a heavy flywheel 30. The projector film drive mechanism is driven from the shaft 29.

In operation, closure of START contactor 23 energises the torque take-up assembly drive motor 13 through series resistor 28. The motor 13 thus starts with reduced torque, the torque increasing as the resistor 28 heats up. At this time, the projector drive motor 2 is not yet energised. The take-up assembly thus takes up film 4 from the loop over loop roller 16 to tension the film.

After a few seconds running, before the loop of film 4 passing over roller 16 is reduced to the minimum loop length, corresponding to the limit of travel of arm 17, and before the torque motor 13 is stopped by the resulting tension of film 4, the relay 25 is actuated. This short-circuits series resistor 28 to supply full power to the motor 13 and at the same time energises the projector drive motor 2.

In this manner tension is gradually applied to the film 4 between the projector 1 and the take-up spool 6 to ensure that no accidental film loop forms to cause film damage or breakage. The film is first tensioned by the torque motor 13 under reduced power and the torque is progressively increased, as the resistance of resistor 28 falls, before the drive motor 2 is energised. The drive motor 2 can then be energised at full power. A high tension can be applied to the film in this way, whereas film breakage would occur if full voltage were applied initially to both motors 2 and 13. During running, any free film length is immediately absorbed in the film loop due to the free movement of the arm 17 in the upward sense. Film spools for carrying some 6,000 ft. length of film can be safely driven and controlled in this manner.

The supply circuits to the motors 2 and 13 are opened by operation of a STOP contactor 27 and the mode of operation described is repeated upon restarting.

What we claim is:

1. Cinematograph film mechanism for a cinematograph projector including a projector mechanism for transporting film through a projection gate and a film take-up mechanism for spooling the projected film thereafter, the said projector mechanism and said take-up mechanism being independently driven by projector and take-up electric motors, in which the two motors are sequentially energized by sequentially operating electrical switch means, the take-up motor being a torque motor, the take-up motor supply circuit including a gradually decreasing electrical power-limiting temperature-sensitive resistor having a falling resistance characteristic with temperature rise due to electrical energy current-flow therein and is electric current series-connected in the take-up motor supply circuit, the sequentially operating switch means comprising a first switch means for energizing the take-up motor before energization of the projector motor and by way of the power-limiting element, and second switch means for subsequently energizing the projector motor and for excluding from electrical circuit the take-up motor power-limiting resistor, and where the sequentially operating switch means further comprises a manually operated START switch connected to actuate a first relay for closing the said first switch, to energize the said take-up motor, and connected to energize an electrical delay relay for delayed closing of the said second switch, to energize the said projector motor, and for delayed closing of a third switch for short-circuiting of the said temperature-sensitive series resistor.

2. Cinematograph film transport mechanism as claimed in claim 1, in which the film transport mechanism includes means for forming a shock-absorbing film loop between the projector mechanism and the take-up mechanism, the said take-up motor operating to tension the film in the said loop and to shorten the loop length and the delay of the said delay relay is predetermined to energise the said projector motor before the said loop is shortened to a predetermined length.

3. Cinematograph film transport mechanism as claimed in claim 2, in which the said film loop forming means includes a movable loop-forming roller, over which the film passes between the projector mechanism and the take-up mechanism, the said roller being urged in the loop-lengthening direction by spring means and being restrained in the loop-shortening direction by a dashpot.

4. Cinematograph film transport mechanism as claimed in claim 3, in which the said film loop forming means comprises, in sequence from the projector mechanism to the take-up mechanism, a film sprocket, a fixed film roller and the said movable roller, the said movable roller being carried at the free end of a pivoted arm, which is urged in the loop-lengthening sense of rotation by a tension spring and is restrained in the loop-shortening sense of rotation by a differential dashpot, whereby free movement of the arm in the loop-lengthening sense is allowed.

5. Cinematograph film transport mechanism as claimed in claim 4, in which the projector drive mechanism includes a heavy flywheel whereby, upon the projector motor being energised, the rate of supply of film to the said shock-absorbing film loop is initially reduced.

* * * * *